United States Patent
Cho (10) Patent No.: US 10,878,670 B1
(45) Date of Patent: Dec. 29, 2020

(54) METHOD FOR PROTECTING PRODUCT AGAINST THEFT AND COMPUTER DEVICE

(71) Applicant: TRIPLE WIN TECHNOLOGY(SHENZHEN) CO. LTD., Shenzhen (CN)

(72) Inventor: Yu-An Cho, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/669,654

(22) Filed: Oct. 31, 2019

(30) Foreign Application Priority Data

Oct. 14, 2019 (CN) .......................... 2019 1 0973719

(51) Int. Cl.
 *G07G 3/00* (2006.01)
 *G08B 13/24* (2006.01)

(52) U.S. Cl.
 CPC ......... *G07G 3/003* (2013.01); *G08B 13/2408* (2013.01); *G08B 13/248* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 2005/0189412 A1* | 9/2005 | Hudnut | ............... | G07G 1/0081 235/383 |
| 2014/0160293 A1* | 6/2014 | Ristivojevic | ..... | G08B 13/19682 348/150 |
| 2014/0254890 A1* | 9/2014 | Bergman | ............ | G08B 13/248 382/118 |
| 2015/0127496 A1* | 5/2015 | Marathe | ............... | G06Q 10/087 705/28 |
| 2015/0269549 A1* | 9/2015 | Herring | ............... | G06Q 20/203 705/18 |
| 2018/0096567 A1* | 4/2018 | Farrow | .................. | G07G 3/003 |
| 2018/0240090 A1* | 8/2018 | Yokoyama | ............. | H04N 7/181 |

* cited by examiner

*Primary Examiner* — Thomas S McCormack
(74) *Attorney, Agent, or Firm* — ScienBiziP, P.C.

(57) ABSTRACT

A product anti-theft method includes acquiring first image from a first photographic device, and obtaining item information of at least one first product and face feature information of a first user by recognizing the first image. The method further includes acquiring second image from a second photographic device, and obtaining item information of at least one second product and face feature information of a second user by recognizing the second image. When the face feature information of the second user is the same as the face feature information of the first user and searched item information is the same as the item information of the at least one second product, it is determined that a handover process is completed and an alarm device of the least one second product is deactivated.

20 Claims, 4 Drawing Sheets

METHOD FOR PROTECTING PRODUCT AGAINST THEFT AND COMPUTER DEVICE

CROSS-REFERENCE TO RELATED APPLICATIONS

This application claims priority to Chinese Patent Application No. 201910973719.6 filed on Oct. 14, 2019, the contents of which are incorporated by reference herein.

FIELD

The subject matter herein generally relates to product anti-theft technology field.

BACKGROUND

In shopping malls or warehouses, open booths are used to display products. The displayed products are equipped with anti-theft devices such as induction magnetic buckles and sensor barcodes. A customer brings the product to a check-out counter to make payment after choosing the product. And a cashier will remove the anti-theft device installed on the products after the payment. Usually unless the product is paid for, the anti-theft device on the products are not removed. An alarm device of the shopping mall will be triggered if the customer attempts to leave the store with the product without purchasing the product.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
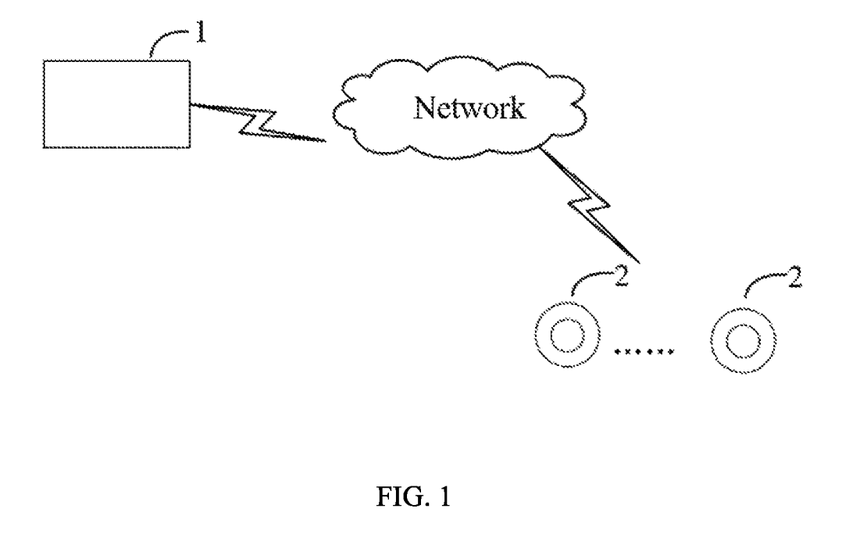
FIG. 1 is a schematic diagram of an application environment architecture of a product anti-theft method of the present disclosure.

FIG. 1 is a schematic diagram of an application environment architecture of a product anti-theft method of the present disclosure. The product anti-theft method is applied in a computer device 1. The computer device 1 is communicating with at least one photographic device 2 through network. The network may be a wired network or a wireless network, such as radio, WI-FI, cellular, satellite, broadcast, etc.

In at least one embodiment, the computer device 1 may be an electronic device storing software for product anti-theft, such as a desktop computer, a personal computer, a server, etc., wherein the server may be a single server, a server cluster, a cloud server, or the like.

In at least one embodiment, the photographic device 2 is an electronic device having a photographing function, including but not limited to a camera, a video camera, a surveillance camera, and the like. The photographic device 2 is located in a preset area for taking a picture of a person entering the preset area, and a picture of persons selecting product in the preset area. The photographic device 2 may be a panoramic camera device in the preset area, or may be a moving camera device that moves with a person entering the preset area, and may also be a plurality of surveillance cameras located at different positions in the preset area.

Figure 2:
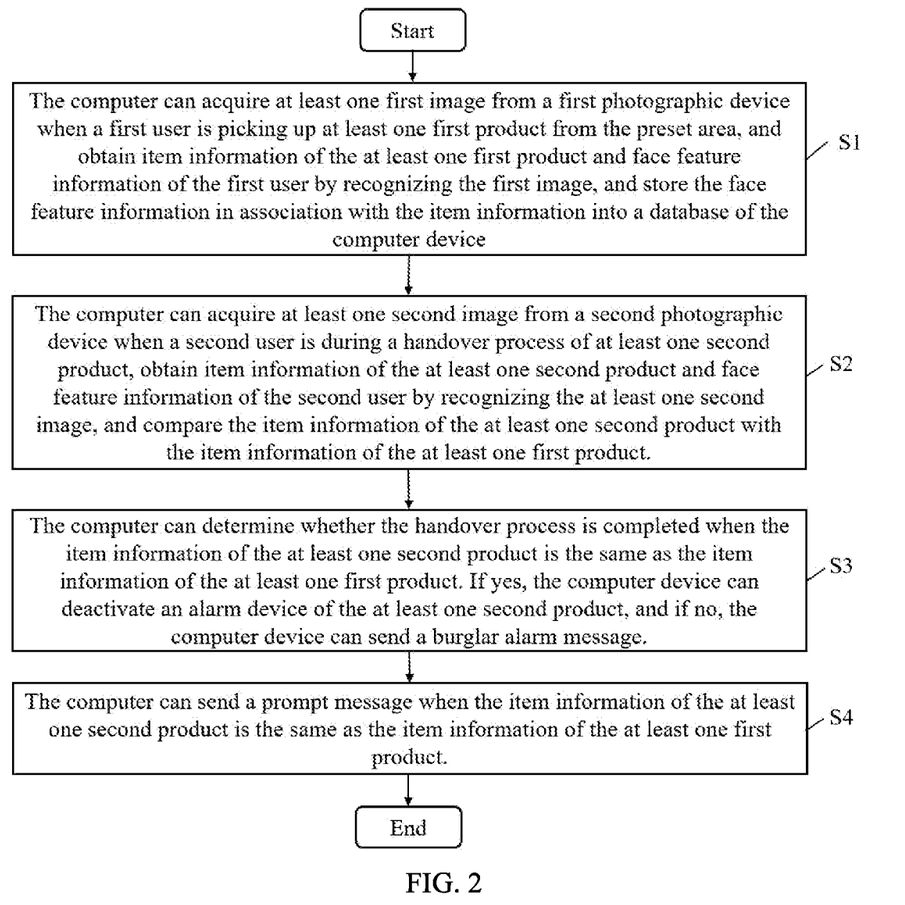
FIG. 2 shows a flow chart of one embodiment of a product anti-theft method of the present disclosure.

FIG. 2 shows a flow chart of one embodiment of a product anti-theft method of the present disclosure. The method is provided by way of example, as there are a variety of ways to carry out the method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the computer device 1 can acquire at least one first image from a first photographic device 2 when a first user is picking up at least one first product from the preset area, and obtain item information of the at least one first product and face feature information of the first user by recognizing the first image, and store the face feature information in association with the item information into a database of the computer device 1.

In at least one embodiment, the preset area can include, but is not limited to, a store and a warehouse. An alarm device is installed on the at least one first product of the preset area, and the alarm device may be a magnetic buckle mounted on the at least one first product, or may be an anti-theft note or an anti-theft device bar code, and so on. The first photographic device 2 is located on the side of the at least one first product in the preset area, and the first photographic device 2 can collect at least one first image when a first user is handling the at least one first product. The first image can include face feature information of the first user and the item information of the at least one first product.

In at least one embodiment, the computer device 1 can receive the first image, and recognize the first image by an image recognition method based on neural network, and obtain the face feature information of the first user and the item information of the at least one first product from the first image. The item information of the at least one first product can include name of the at least one first product, and total quantity of the at least one first product. The computer device 1 can store the face feature information of the first user and the item information of the at least one first product into a database with a preset storage format. For example, the preset storage format can be face feature information-name of the first product-quantity of the first products. In at least one embodiment, the preset storage format can be represented by a combination of words, quantity, and/or letters. For example, the preset storage format can be A01-AB1-X, A01 to represent the face feature information, AB1 represents the name of the first product, and X represents the total quantity of the first products. When the user is taking several products, for example, one first product and two second products, the preset storage format of the first product is A01-AB1-01, and the preset storage format of the second products is A01-AB2-02.

At block S2, the computer device 1 can acquire at least one second image from a second photographic device 2 when a second user is during a handover process of at least one second product, obtain item information of the at least one second product and face feature information of the second user by recognizing the at least one second image, and compare the item information of the at least one second product with the item information of the at least one first product. In at least one embodiment, the handover process of at least one second product is someone (e.g., a staff of a store) handing the second product to the second user. For example, the staff of the store is handing the second product to the second user after the second user paying for the second product. Or the staff of a warehouse is handing the second product to the second user.

In at least one embodiment, when the preset area is a shopping mall, the second photographic device 2 can be located at a checkout counter of the shopping mall. The second photographic device 2 can collect images of the products to be paid for and a user carrying the products. In other embodiments, when the preset area is a warehouse, the second photographic device 2 can be located at an exit port of the warehouse. The second photographic device 2 can collect images of the products and a user carrying the products to the checkout.

In at least one embodiment, the computer device 1 can receive the at least one second image, and recognize the at least one second image by an image recognition method based on neural network, and obtain the face feature information of second user and the item information of the second product from the second image. The item information of the second product can include label of the second product, name of the second product, and total quantity of the second product. The computer device 1 can determine whether the face feature information of the second user is the same as the face feature information of the first user, and search for item information associating to the face feature information of the first user when the face feature information of the second user is the same as the face feature information of the first user. The computer device 1 can determine whether the searched item information exists in the at least one second image, and determine whether the searched item information is the same as the item information of the second product when the searched item information exists in the at least one second image.

For example, the computer device 1 can acquire the at least one first image from the first photographic device 2 when a first user named Michael is picking up at least one first product from a store, and obtaining item information of the at least one first product and face feature information of Michael by recognizing the first image. The item information of the at least one first product can include a Hua Wei mate 30 phone, and a wristwatch. The computer device 1 can store the face feature information of Michael and the item information of the at least one first product into the database. The preset storage format of the Hua Wei mate 30 phone is A02-MF1-01, and the preset storage format of the wristwatch is A02-EW1-01. When Michael is carrying the phone and watch to the checkout counter of the store, the computer device 2 can acquire at least one second image of Michael at the checkout counter from the second photographic device 2, and recognize face feature information of Michael from the at least one second image. The computer device 2 can search for item information associating to the face feature information of Michael from the database. The searched item information can include labels and quantity of the phone and watch. For example, the label of the phone is MF1, and the label of the watch is EW1, and the quantity of the phone is one, and the quantity of the watch is one. The computer device 1 can determine whether the searched item information exists in the at least one second image, and determine whether the quantity of the second products is the same as the quantity of the first products when the searched item information exists in the at least one second image. For example, the computer device 1 can determine whether the quantity of the phone and the quantity of the wristwatch are the same as the quantity of the phone and watch of the first image when the labels of the phone and watch exist in the at least one second image.

At block S3, the computer device 1 can determine whether the handover process is completed when the item information of the at least one second product is the same as the item information of the at least one first product. When the handover process is completed, the computer device 1 can deactivate an alarm device of the at least one second product. For example, when the alarm device is a magnetic buckle, the computer device 1 can send a prompt message to a staff member of the preset area to remove the magnetic buckle of the at least one second product. When the alarm device is a bar code, the computer device 1 can send a prompt message to a staff member of the preset area to scan the bar code of the at least one second product by a barcode scanner. And the computer device 1 can determine whether a handover item of the handover process is completed. When the handover process is not completed, the computer device 1 can send alarm or message or both.

In at least one embodiment, a method for determining whether a handover item of the handover process is completed can include: the computer device 1 can recognize behavioral characteristic of the at least one second image, and determine whether the recognized behavioral characteristic is one of preset handover behaviors. When the recognized behavioral characteristic is one of the preset handover behaviors, the computer device 1 can determined whether the handover item of the handover process is completed. When the recognized behavioral characteristic is not one of the preset handover behaviors, the computer device 1 can determine that the handover item of the handover process is not completed. The handover process can include payment process, and review process. The handover item can include a payment item and an audit item.

In at least one embodiment, the method for determining whether the recognized behavioral characteristic is one of preset handover behaviors can include: the computer device 1 can recognize behavioral characteristic of the at least one second image by a human behavior recognition algorithm, and obtain at least one behavioral characteristic image according to the recognized behavioral characteristics. The computer device 1 can determine a human action of the second user represented by the at least one behavioral characteristic image. When the determined human action is one of the preset actions, the computer device 1 can determine that the recognized behavioral characteristic is one of the preset handover behaviors. When the determined human action is not one of the preset actions, the computer device 1 can determine that the recognized behavioral characteristic is not one of the preset handover behaviors. The preset actions can include a pay for action, and an outbound transfer action.

In at least one embodiment, when the preset area is a warehouse, a method for determining whether the handover item of the handover process is completed can include: the computer device 1 can search for an outbound record of the warehouse, and determine whether an outbound information of the handover item exists in the outbound record. When the outbound information of the handover item exists in the outbound record, the computer device 1 can determine whether the item information of the outbound information is the same as the item information of the at least one second image. When the item information of the outbound information is the same as the item information of the at least one second image, the computer device 1 can determine that the handover item of the handover process is completed. When the item information of the outbound information is different from the item information of the at least one second image, the computer device 1 can determine that the handover item of the handover process is not completed.

In at least one embodiment, when the preset area is a store, a method for determining whether the handover item of the handover process is completed can include: the computer device 1 can search for a payment collection record of the store based on a manner of payment, and determine whether payment information of the at least one second product exists in the payment collection record. When the way of payment of the payment collection record is not cash, the computer device 1 can determine whether payment information of the at least one second product exists in the payment collection record. When the payment information of the at least one second product exists in the payment collection record, the computer device 1 can determine that the handover item of the handover process is completed. When the payment information of the at least one second product does not exist in the payment collection record, the computer device 1 can determine that the handover item of the handover process is not completed.

In at least one embodiment, when the way of payment of the payment collection record is cash, the computer device 1 can receive a total quantity of newly added cash amounts in different denomination areas of the checkout counter sent by at least one sensor. The at least one sensor is located in the denomination areas of the checkout counter. The computer device 1 can calculate a total cash value by the total quantity times the value of the newly added cash, and determine whether the calculated total cash is equal to the price of the second product. When the calculated total cash is equal to the price of the second product, the computer device 1 can determine that the handover item of the handover process is completed. When the calculated total cash is different from the price of the second product, the computer device 1 can determine that the handover item of the handover process is not completed.

In at least one embodiment, the method further can include: the computer device 1 can search for an inventory record of the preset area, and modify inventory record of the second product in the inventory record.

For example, when the product is needed to be paid for by Michael, the computer device 1 can determine that the second product acquired by the second photographic device 2 is the as the first product acquired by the first photographic device 2. The computer device 1 can search for a payment collection record of the store. For example, if Michael uses non-cash payment method such as credit card, QR code payment, bus card, and shopping stored value card pay for the product, the computer device 1 can search for payment collection record of a collection account of the store, and determine whether the record of Michael paying for the product exists in the payment collection record. If Michael uses cash pay for the product, the computer device 1 can receive the total quantity of newly added cash amounts in different denomination areas of the checkout counter send by at least one sensor, and calculate the total cash value by the total quantity times the value of the newly added cash. The computer device 1 can determine whether Michael made payment for the product. When Michael did make payment for the product, the computer device 1 can send a prompt message to a staff member of the preset area for deactivating the alarm device of the product, and modify the inventory record of the store. For example, the computer device 1 can modify the quantity of the products of the store. When Michael is not completed paying for the product, the computer device 1 can send a prompt message to a staff member of the preset area. For example, the computer device 1 can send the prompt message to the staff member by calling the staff member, or sending a text message to the staff member.

At block S4, the computer device 1 can send a prompt message when the item information of the at least one second product is different from the item information of the at least one first product.

In at least one embodiment, when the name of the second product of the second image is different from the name of the first product of the first image, the computer device 1 can send the prompt message. The computer device 1 can send the prompt message to the staff member by calling the staff member, or sending a text message to the staff member.

Figure 3:
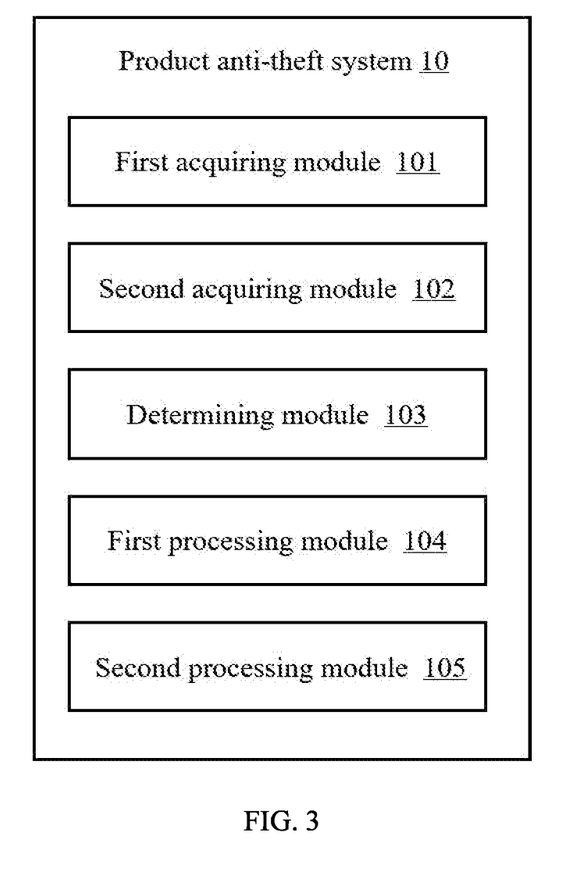
FIG. 3 shows an embodiment of modules of a product anti-theft system of the present disclosure.

FIG. 3 shows an embodiment of modules of a product anti-theft system of the present disclosure.

In some embodiments, the product anti-theft system 10 runs in a computer device. The computer device 1 is communicated with at least one photographic device 2 through network. The product anti-theft system 10 can include a plurality of modules. The plurality of modules can comprise computerized instructions in a form of one or more computer-readable programs that can be stored in a non-transitory computer-readable medium (e.g., a storage device of the computer device), and executed by at least one processor of the computer device to implement product anti-theft function (described in detail in FIG. 2).

In at least one embodiment, the product anti-theft system 10 can include a plurality of modules. The plurality of modules can include, but is not limited to, a first acquiring module 101, a second acquiring module 102, a determining module 103, a first processing module 104, and a second processing module 105. The modules 101-105 can comprise computerized instructions in the form of one or more computer-readable programs that can be stored in the non-transitory computer-readable medium (e.g., the storage device of the computer device), and executed by the at least one processor of the computer device to implement product anti-theft function (e.g., described in detail in FIG. 2).

In at least one embodiment, the first acquiring module 101 can acquire at least one first image from the first photographic device when a first user is picking up at least one first product from a preset area, obtain item information of the at least one first product and face feature information of the first user by recognizing the at least one first image; store the face feature information in association with the item information into a database of the computer device.

In at least one embodiment, the second acquiring module 102 can acquire at least one second image from the second photographic device when a second user is during a handover process of at least one second product, obtain item information of the at least one second product and face feature information of the second user by recognizing the at least one second image, and compare the item information of the second product with the item information of the first product.

In at least one embodiment, the determining module 103 can determine whether the item information of the second product is the same as the item information of the first product. The determining module 103 further can determine whether the face feature information of the second user is the same as the face feature information of the first user.

In at least one embodiment, the first processing module 104 can determine whether the handover process is completed when the item information of the second product is the same as the item information of the first product, and deactivate an alarm device of the least one second product when the handover process is completed, and send a burglar alarm message when the handover process is not completed.

In at least one embodiment, the second processing module 104 can send a prompt message when the item information of the second product is different from the item information of the first product. The second processing module 104 further can send a prompt message to the second user to check the at least one second product when the searched item information is different from the item information of the at least one second product.

Figure 4:
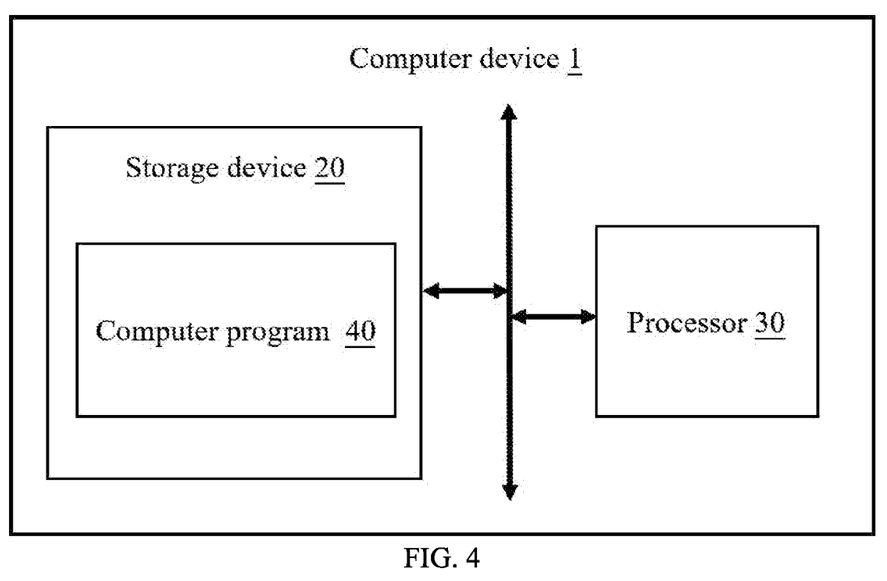
FIG. 4 shows one embodiment of a schematic structural diagram of a computer device of the present disclosure.

FIG. 4 shows one embodiment of a schematic structural diagram of a computer device. In an embodiment, a computer device 1 includes a storage device 20, at least one processor 30, and a computer program 40 stored in the storage device 20 and executable on the at least one processor 30. When the processor 30 executes the computer program 40, the blocks in the foregoing embodiment of the product anti-theft method are implemented. For example, blocks S1~block S4. Or the modules in the foregoing embodiment of the product anti-theft system are implemented. For example, modules 101-105 as shown in FIG. 3. It should be understood by those skilled in the art that the structure of the computer device 1 shown in FIG. 4 does not constitute a limitation of the embodiment of the present disclosure. The computer device 1 may have a bus type structure or a star type structure, and the computer device 1 may further include other hardware or software, or the computer device 1 may have different component arrangements.

In at least one embodiment, the computer program 40 can be partitioned into one or more modules/units that are stored in the storage device 20 and executed by the processor 30. The one or more modules/units may be a series of computer program instruction segments capable of performing a particular function for describing the execution of the computer program 40 in the computer device 1. For example, the computer program 40 can be partitioned into a first acquiring module 101, a second acquiring module 102, a determining module 103, a first processing module 104, and a second processing module 105.

In at least one embodiment, the computer device 1 can be a computing device such as a desktop computer, a notebook, a palmtop computer, and a cloud server. It will be understood by those skilled in the art that the schematic diagram is merely an example of the computer device 1, and does not constitute a limitation of the computer device 1, and may include more or less components than those illustrated, or some components may be combined, or different. Components, such as the computer device 1, may also include input and output devices, network access devices, buses, and the like.

In at least one embodiment, the at least one processor 30 may be a central processing unit (CPU), and may also include other general-purpose processors, digital signal processors (DSPs), application specific integrated circuits (ASICs), and off-the-shelf programmable gate arrays, Field-Programmable Gate Array (FPGA) or other programmable logic device, discrete gate, or transistor logic device, discrete hardware components, etc. The general-purpose processor may be a microprocessor or the processor may be any conventional processor or the like. The processor 30 is control center of the computer device 1, and connects sections of the entire computer device 1 with various interfaces and lines.

In some embodiments, the storage device 20 can be used to store program codes of computer readable programs and various data, such as image processing method installed in the computer device 1. The storage device 20 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 1.

The modules/units integrated by the computer device 1 can be stored in a computer readable storage medium if implemented in the form of a software functional unit and sold or used as a stand-alone product. The present disclosure implements all or part of the processes in the foregoing embodiments, and a computer program may also instruct related hardware. The computer program may be stored in a computer readable storage medium. The steps of the various method embodiments described above may be implemented by a computer program when executed by a processor. Wherein, the computer program comprises computer program code, which may be in the form of source code, product code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM)., random access memory (RAM), electrical carrier signals, telecommunications signals, and software distribution media. It should be noted that the content contained in the computer readable medium may be increased or decreased according to the requirements of legislation and patent practice in a jurisdiction, for example, in some jurisdictions, computer-readable media does not include electrical carrier signals and telecommunication signals.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure is intended to be included within the scope of the present disclosure.

What is claimed is:

1. A product anti-theft method applicable in a computer device,
    the computer device is communicating with a first photographic device and a second photographic device, the method comprising:
    acquiring at least one first image from the first photographic device when a first user is picking up at least one first product from a preset area;
    obtaining item information of the at least one first product and face feature information of the first user by recognizing the at least one first image;
    storing the face feature information in association with the item information into a database of the computer device;
    acquiring at least one second image from the second photographic device when performing a handover process, wherein the handover process is a process when someone handing the at least one second product to the second user;
    obtaining item information of the at least one second product and face feature information of the second user by recognizing the at least one second image;
    determining whether the face feature information of the second user is the same as the face feature information of the first user;
    searching for item information associated to the face feature information of the first user in the database if the face feature information of the second user is the same as the face feature information of the first user;
    determining whether the searched item information is the same as the item information of the at least one second product;
    determining whether the handover process is completed if the searched item information is the same as the item information of the at least one second product;
    deactivating an alarm device of the least one second product if the handover process is completed; and
    sending a burglar alarm message if the handover process is not completed.

2. The method according to claim 1, wherein the method further comprising:
    sending a prompt message to the second user to check the at least one second product if the searched item information is different from the item information of the at least one second product.

3. The method according to claim 1, wherein the determining whether the handover process is completed comprising:
    recognizing behavioral characteristic of the at least one second image;
    determining whether the recognized behavioral characteristic is one of preset handover behaviors;
    determining whether a handover item of the handover process is completed if the recognized behavioral characteristic is one of the preset handover behaviors;
    determining that the handover process is completed when the handover item of the handover process is completed; and
    determining that the handover process is not completed if the handover item of the handover process is not completed, and sending the burglar alarm message.

4. The method according to claim 3, wherein the determining whether the recognized behavioral characteristic is one of the preset handover behaviors comprising:
    recognizing behavioral characteristic of the at least one second image by a human behavior recognition algorithm;
    obtaining at least one behavioral characteristic image according to the recognized behavioral characteristic;
    determining a human action of the second user represented by the at least one behavioral characteristic image;
    determining that the recognized behavioral characteristic is one of the preset handover behaviors when the determined human action of the second user is one of the preset actions; and
    determining that the recognized behavioral characteristic is not one of the preset handover behaviors if the determined human action is not one of the preset actions.

5. The method according to claim 3, wherein if the preset area is a warehouse, the determining whether a handover item of the handover process is completed comprising:
    searching for an outbound record of the warehouse;
    determining whether an outbound information of the handover item exists in the outbound record;
    determining whether the item information of the outbound information is the same as the item information of the at least one second image if the outbound information of the handover item exists in the outbound record;
    determining that the handover item of the handover process is completed if the item information of the outbound information is the same as the item information of the at least one second image; and
    determining that the handover item of the handover process is not completed if the item information of the outbound information is different from the item information of the at least one second image.

6. The method according to claim 3, wherein if the preset area is a store, the determining whether a handover item of the handover process is completed comprising:
    searching for a payment collection record of the store;
    determining whether payment information of the at least one second product exists in the payment collection record;
    determining that the handover item of the handover process is completed if the payment information of the at least one second product exists in the payment collection record; and
    determining that the handover item of the handover process is not completed if the payment information of the at least one second product does not exist in the payment collection record.

7. The method according to claim 3, wherein the method further comprising:

searching for an inventory record of the preset area, and modifying inventory record of the at least one second product in the inventory record.

8. A computer device is communicating with a first photographic device and a second photographic device, the computer device comprising:

a storage device;

at least one processor; and the storage device storing one or more programs that, when executed by the at least one processor, cause the at least one processor to:

acquire at least one first image from the first photographic device when a first user is picking up at least one first product from a preset area;

obtain item information of the at least one first product and face feature information of the first user by recognizing the at least one first image;

store the face feature information in association with the item information into a database of the computer device;

acquire at least one second image from the second photographic device when performing a handover process, wherein the handover process is a process when someone handing the at least one second product to the second user;

obtain item information of the at least one second product and face feature information of the second user by recognizing the at least one second image;

determine whether the face feature information of the second user is the same as the face feature information of the first user;

search for item information associated to the face feature information of the first user in the database if the face feature information of the second user is the same as the face feature information of the first user;

determine whether the searched item information is the same as the item information of the at least one second product;

determine whether the handover process is completed if the searched item information is the same as the item information of the at least one second product;

deactivate an alarm device of the least one second product if the handover process is completed; and send a burglar alarm message if the handover process is not completed.

9. The computer device according to claim 8, wherein the at least one processor is further caused to:

send a prompt message to the second user to check the at least one second product if the searched item information is different from the item information of the at least one second product.

10. The computer device according to claim 8, wherein the at least one processor is further caused to:

recognize behavioral characteristic of the at least one second image;

determine whether the recognized behavioral characteristic is one of preset handover behaviors;

determine whether a handover item of the handover process is completed if the recognized behavioral characteristic is one of the preset handover behaviors;

determine that the handover process is completed when the handover item of the handover process is completed; and determining that the handover process is not completed if the handover item of the handover process is not completed, and sending the burglar alarm message.

11. The computer device according to claim 10, wherein the at least one processor is further caused to:

recognize behavioral characteristic of the at least one second image by a human behavior recognition algorithm;

obtain at least one behavioral characteristic image according to the recognized behavioral characteristic;

determine a human action of the second user represented by the at least one behavioral characteristic image; determining that the recognized behavioral characteristic is one of the preset handover behaviors when the determined human action of the second user is one of the preset actions; and determine that the recognized behavioral characteristic is not one of the preset handover behaviors if the determined human action is not one of the preset actions.

12. The computer device according to claim 10, wherein when the preset area is a warehouse, the at least one processor is further caused to:

search for an outbound record of the warehouse;

determine whether an outbound information of the handover item exists in the outbound record;

determine whether the item information of the outbound information is the same as the item information of the at least one second image if the outbound information of the handover item exists in the outbound record;

determine that the handover item of the handover process is completed if the item information of the outbound information is the same as the item information of the at least one second image; and determine that the handover item of the handover process is not completed if the item information of the outbound information is different from the item information of the at least one second image.

13. The computer device according to claim 10, wherein when the preset area is a store, the at least one processor is further caused to:

search for a payment collection record of the store;

determine whether payment information of the at least one second product exists in the payment collection record;

determine that the handover item of the handover process is completed if the payment information of the at least one second product exists in the payment collection record; and determine that the handover item of the handover process is not completed if the payment information of the at least one second product does not exist in the payment collection record.

14. The computer device according to claim 10, wherein the at least one processor is further caused to:

search for an inventory record of the preset area, and modify inventory record of the at least one second product in the inventory record.

15. A non-transitory storage medium having stored thereon instructions that, when executed by a processor of a computer device, the computer device is communicating with a first photographic device and a second photographic device, causes the processor to perform a product anti-theft method, the method comprising:

acquiring at least one first image from the first photographic device when a first user is picking up at least one first product from a preset area;

obtaining item information of the at least one first product and face feature information of the first user by recognizing the at least one first image;

storing the face feature information in association with the item information into a database of the computer device;

acquiring at least one second image from the second photographic device when performing a handover process, wherein the handover process is a process when someone handing the at least one second product to the second user;

obtaining item information of the at least one second product and face feature information of the second user by recognizing the at least one second image;

determining whether the face feature information of the second user is the same as the face feature information of the first user;

searching for item information associated to the face feature information of the first user in the database if the face feature information of the second user is the same as the face feature information of the first user;

determining whether the searched item information is the same as the item information of the at least one second product;

determining whether the handover process is completed if the searched item information is the same as the item information of the at least one second product;

deactivating an alarm device of the least one second product if the handover process is completed; and sending a burglar alarm message if the handover process is not completed.

16. The non-transitory storage medium according to claim 15, wherein the determining whether the handover process is completed comprising:

recognizing behavioral characteristic of the at least one second image;

determining whether the recognized behavioral characteristic is one of preset handover behaviors;

determining whether a handover item of the handover process is completed if the recognized behavioral characteristic is one of the preset handover behaviors;

determining that the handover process is completed when the handover item of the handover process is completed; and determining that the handover process is not completed if the handover item of the handover process is not completed, and sending the burglar alarm message.

17. The non-transitory storage medium according to claim 16, wherein the determining whether the recognized behavioral characteristic is one of the preset handover behaviors comprising:

recognizing behavioral characteristic of the at least one second image by a human behavior recognition algorithm;

obtaining at least one behavioral characteristic image according to the recognized behavioral characteristic;

determining a human action of the second user represented by the at least one behavioral characteristic image; determining that the recognized behavioral characteristic is one of the preset handover behaviors when the determined human action of the second user is one of the preset actions; and determining that the recognized behavioral characteristic is not one of the preset handover behaviors if the determined human action is not one of the preset actions.

18. The non-transitory storage medium according to claim 16, wherein if the preset area is a warehouse, the determining whether a handover item of the handover process is completed comprising:

searching for an outbound record of the warehouse;

determining whether an outbound information of the handover item exists in the outbound record;

determining whether the item information of the outbound information is the same as the item information of the at least one second image if the outbound information of the handover item exists in the outbound record;

determining that the handover item of the handover process is completed if the item information of the outbound information is the same as the item information of the at least one second image; and determining that the handover item of the handover process is not completed if the item information of the outbound information is different from the item information of the at least one second image.

19. The non-transitory storage medium according to claim 16, wherein if the preset area is a store, the determining whether a handover item of the handover process is completed comprising:

searching for a payment collection record of the store;

determining whether payment information of the at least one second product exists in the payment collection record;

determining that the handover item of the handover process is completed if the payment information of the at least one second product exists in the payment collection record; and determining that the handover item of the handover process is not completed if the payment information of the at least one second product does not exist in the payment collection record.

20. The non-transitory storage medium according to claim 16, wherein the method further comprising:

searching for an inventory record of the preset area, and modifying inventory record of the at least one second product in the inventory record.

* * * * *